(12) United States Patent
Koch et al.

(10) Patent No.: US 6,926,344 B2
(45) Date of Patent: Aug. 9, 2005

(54) PLEAT OR CORRUGATION OF A BELLOWS OF A CONNECTION BETWEEN TWO HINGE-LINKED VEHICLES OR VEHICLE SECTIONS E.G., OF AN ARTICULATED BUS

(75) Inventors: Robert Koch, Bad Sooden Allendorf (DE); Knud Mosaner, Kassel (DE)

(73) Assignee: Huebner GmbH, Kassel (DE)

( * ) Notice: Subject to any disclaimer, the term of this patent is extended or adjusted under 35 U.S.C. 154(b) by 0 days.

(21) Appl. No.: 10/616,322

(22) Filed: Jul. 8, 2003

(65) Prior Publication Data
US 2004/0036319 A1 Feb. 26, 2004

(30) Foreign Application Priority Data
Aug. 23, 2002 (DE) .......................................... 102 38 673

(51) Int. Cl.[7] ................................................. B60J 1/00
(52) U.S. Cl. ............................ 296/178; 105/18; 105/15
(58) Field of Search ................................. 296/178, 179, 296/29, 1.06; 105/350, 15, 18; 72/370.23

(56) References Cited

U.S. PATENT DOCUMENTS

| | | | | |
|---|---|---|---|---|
| 710,924 A | * | 10/1902 | Schroyer | 105/18 |
| 777,234 A | * | 12/1904 | Wood | 105/18 |
| 1,189,460 A | * | 7/1916 | Lynch | 105/18 |
| 1,586,812 A | | 6/1926 | Klos | |
| 2,193,156 A | * | 3/1940 | Antoine | 105/15 |
| 2,563,411 A | * | 8/1951 | Miller | 10/616 |
| 2,568,684 A | * | 9/1951 | Mihalyi | 105/18 |
| 2,991,509 A | * | 7/1961 | Brophy, Jr. | 105/15 |
| 3,387,568 A | * | 6/1968 | Hawes | 105/18 |
| 4,318,345 A | * | 3/1982 | Kleim | 105/18 |
| 4,477,099 A | * | 10/1984 | Luyckx | 296/178 |
| 4,690,421 A | * | 9/1987 | Schmidt et al. | 105/18 |
| 4,860,665 A | * | 8/1989 | Schmidt | 105/18 |
| 5,033,395 A | * | 7/1991 | Bechu et al. | 105/18 |
| 5,456,186 A | * | 10/1995 | Hubner | 105/18 |
| 5,546,866 A | * | 8/1996 | Koch | 105/18 |
| 6,054,194 A | | 4/2000 | Kane | |
| 6,397,653 B1 | * | 6/2002 | Kane et al. | 72/370.23 |

FOREIGN PATENT DOCUMENTS

| | | |
|---|---|---|
| DE | 2617931 | 11/1977 |
| DE | 36 04 988 | 8/1987 |
| DE | 36 12 425 | 10/1987 |
| EP | 0 653 319 | 5/1995 |
| FR | 2 682 344 | * 10/1991 |

* cited by examiner

*Primary Examiner*—Kiran B. Patel
(74) *Attorney, Agent, or Firm*—Jordan and Hamburg LLP

(57) ABSTRACT

The subject matter of the invention is a pleat or corrugation of a bellows of a connection between two hinge-linked vehicles or vehicle sections e.g., of an articulated bus, the corrugation or pleat in the corner zone of the bellows being comprised, for the purpose of increasing the expansion of the bellows in the corner zone, of a pleat or corrugation insert unit having a plurality of pleats or corrugations, with said pleat or corrugation insert unit (20) tapering in the region of the upper end thereof toward the vertex (11) of the pleat (10) or corrugation where it is connected to said pleat or corrugation.

16 Claims, 3 Drawing Sheets

PLEAT OR CORRUGATION OF A BELLOWS OF A CONNECTION BETWEEN TWO HINGE-LINKED VEHICLES OR VEHICLE SECTIONS E.G., OF AN ARTICULATED BUS

CROSS-REFERENCE TO RELATED APPLICATIONS

This application claims Priority from German Application No. DE 102 38 673.0-21 filed on Aug. 23, 2002.

1. Field of the Invention

The present invention relates to a pleat or corrugation of a bellows of a connection between two hinge-linked vehicles or vehicle sections e.g., of an articulated bus.

2. Description of the Prior Art

Expansion or concertina bellows are known. They are part of a connection between two hinge-linked vehicles e.g., an articulated bus, and surround the intercar gangway and the articulation like a sleeve with an approximately rectangular cross section so as to allow passengers to cross from one vehicle section to the other without being exposed to weather conditions.

Moreover, what are termed low floor vehicles are known. Such type low floor vehicles are characterized in that they have very low ground clearance. Low floor vehicles permit the possibility of level boarding, which is particularly advantageous for wheel-chair users. One problem with these articulated vehicles, more specifically busses, is the low ground clearance. In order to prevent the bellows from brushing along the road when driving over a hilltop or through a depression it is known to reduce the height of the pleats in the bottom region. To reduce the height of the pleat naturally involves the reduction of the maximum expansion when such an articulated vehicle provided with a bellows is threading a curve. However, the expansion width is not only reduced by reducing the height of the pleats or corrugations in the bottom region, but also by the fact that the very corner radius of the bellows already suffices to reduce the expansion. This is to say that two factors come together; on the one side the fact that, due to the corner configuration of the bellows, but a reduced expansion is possible, on the other side that, more specifically with low floor vehicles, the height of the pleats or corrugations in the transition zone, meaning in the transition zone between the side wall and the bottom or the ceiling, i.e., in the corner zone, is also reduced. These two factors together reduce the expansion width.

EP 653 319 teaches to provide a wider expansion by implementing a special design of the pleat in the corner zone by forming a pocket.

The published application DE-OS 26 17 931 also teaches to dispose what is termed a double pleat between two normal pleats in an effort to increase the expansion, in the corner zone in particular.

It has been found though that, more specifically with low floor vehicles and with vehicles that are to travel around sharp curves, these measures do not suffice to provide the required expansion width.

BRIEF DESCRIPTION OF THE INVENTION

It is therefore the object of the invention to provide an expansion or a concertina bellows, more specifically for a low floor vehicle, that permits the vehicle to travel around sharp curves by increasing the expansion of the bellows in the corner zone thereof.

In accordance with the invention, the solution to this object is achieved in that, for the purpose of increasing the expansion of the bellows in the corner zone, the corrugation or pleat in the corner zone of the bellows is comprised of a pleat or corrugation insert unit having a plurality of pleats or corrugations, with said pleat or corrugation insert unit tapering in the region of the upper end thereof toward the vertex of the pleat or corrugation where it is connected to said pleat or corrugation.

Accordingly, the invention is based on the idea that an existing pleat or corrugation is to be divided into a plurality of pleats or corrugations forming a unit for the purpose of achieving the desired expansion in the corner zone, i.e., in the transition zone between the side wall and the bottom or the ceiling region, by providing one single pleat, which is called the main pleat or corrugation, with this plurality of pleats or corrugations.

Advantageous characteristics and embodiments of the invention will become apparent from the subclaims.

There is more specifically provided that the pleat insert or corrugation insert unit is made in one piece, e.g., is injection molded polyurethane. By injection moulding such an insert unit, it is achieved that a plurality of pleats or corrugations that are to converge at a point, namely at the point of transition to the vertex of the main pleat or corrugation receiving said unit, will not form too thick a bulk. This would more specifically be the case if the various pleats or corrugations of this separate unit were sewn together in the manner also known from bellows manufacturing.

According to another feature of the invention, the pleats or corrugations of the pleat or corrugation insert units in the transition zone toward the bottom of the bellows have a height corresponding to the height of the pleat or corrugation which receives the pleat or corrugation insert unit. As a result, the height of all of the pleats or corrugations in the region of the bottom of the bellows is substantially the same, with the pleats or corrugations generally becoming increasingly flat toward the center of the transition and possibly tapering into a fabric forming the bottom of the bellows.

According to another advantageous feature of the invention there is provided that in the region of the transition to the vertex of the receiving pleat or corrugation the pleat or corrugation insert unit tapers toward the vertex of the pleat or corrugation to approximately the thickness of the pleat or corrugation material. It will be obvious therefrom that the pleat or corrugation insert unit has the appearance of a banana in cross section. In order to stabilize the very pleat of the pleat insert element, there may be provided a border member at the vertex of the pleats of the pleat insert unit, said border member being disposed in the form of a frame for example. The same applies to the main pleat.

The invention is explained in more detail by way of example only with reference to the drawing.

DETAILED DESCRIPTION OF THE INVENTION

A bellows is part of a connection between two hinge-linked vehicles V1, V2. The bellows, whether implemented as an expansion bellows or as a concertina bellows, surrounds the transition zone between these two vehicles or vehicle sections like a closed tunnel having a substantially rectangular cross-section with rounded corners.

Figure 1:
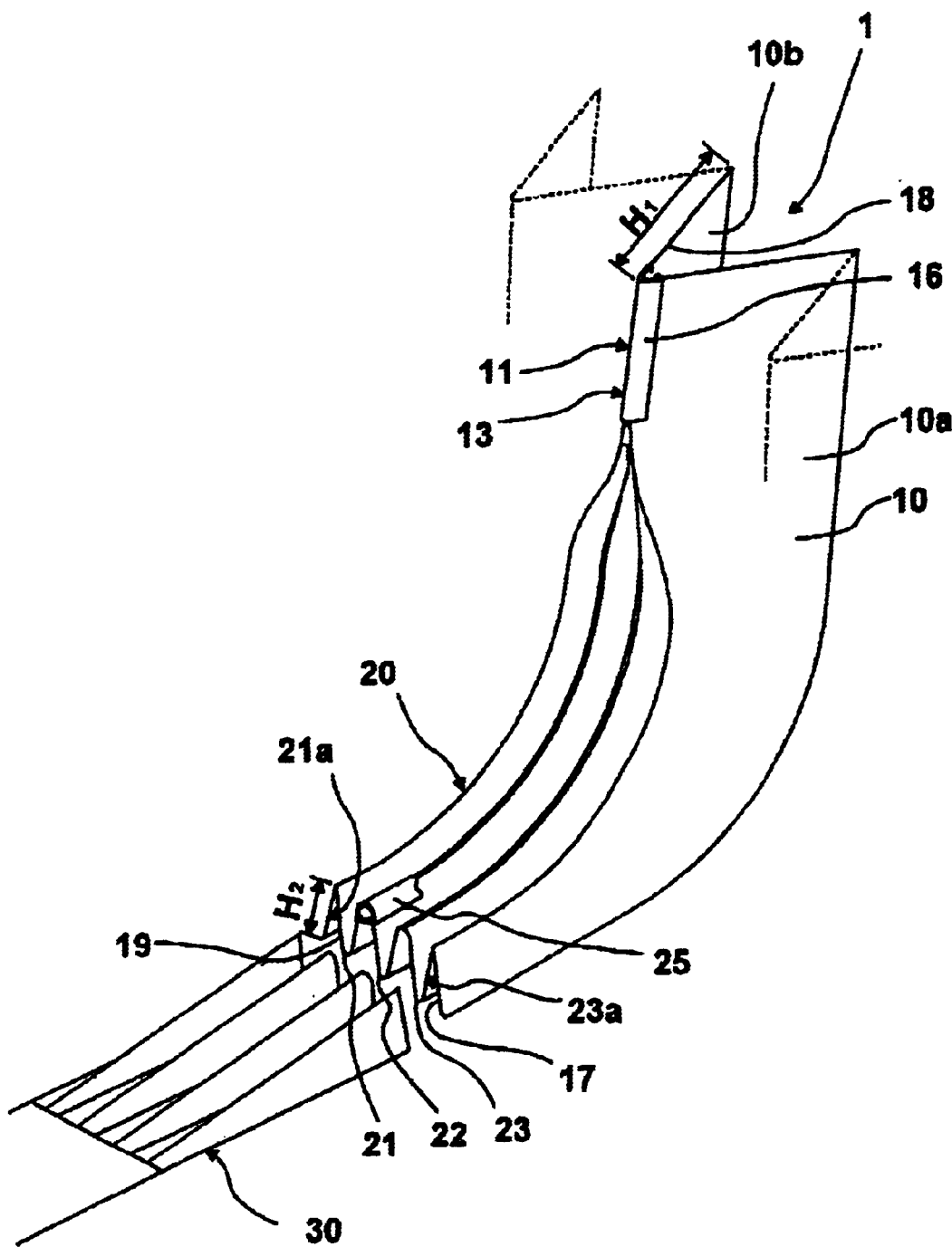
FIG. 1 is a perspective detail view of the corner zone of a bellows in the transition zone between the side wall and the bottom of the bellows.

The illustration according to FIG. 1 shows, as already explained, a detail of the corner zone of a concertina bellows in the transition zone between the side wall and the bottom. The drawing shows a portion of a concertina bellows, it should however be noted here that an expansion bellows can be provided with a corrugation insert unit in a similar way. The detail of a concertina bellows, which is labelled at 1 in FIG. 1, shows the pleat designed at 10. The pleat 10 (main pleat) has a vertex 11, said vertex 11 opening in the transition zone between the side wall and the bottom to receive the pleat insert unit 20 of the invention. In the instant case, said pleat insert unit 20 is comprised of three pleat inserts 21, 22, 23, the outer sides 21a and 23a of the pleat inserts being connected to the sides 10a or 10b of the main pleat 10. The height of the main pleat 10 or corrugation receiving the pleat or corrugation insert unit 20 is much lower (see $H_2$) in the bottom region 17 than the height $H_1$ in the upper region 18 of the side wall. Said pleat inserts 21, 22, 23 of the pleat insert unit converge so to speak at an end region (arrow 13) in the vertex 11 of the main pleat 10.

Figure 2:
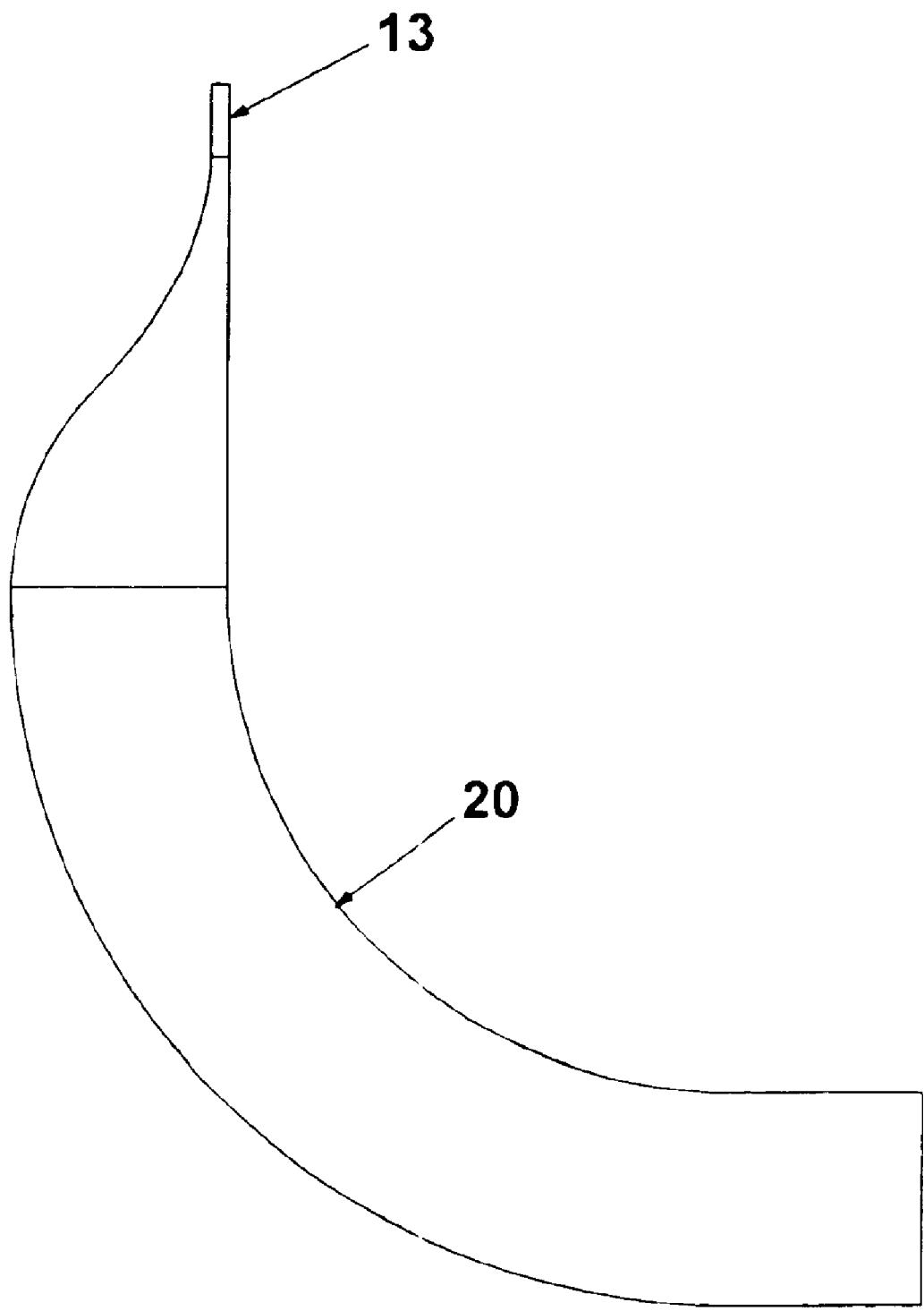
FIG. 2 is a side view of a pleat insert only.
Figure 3:
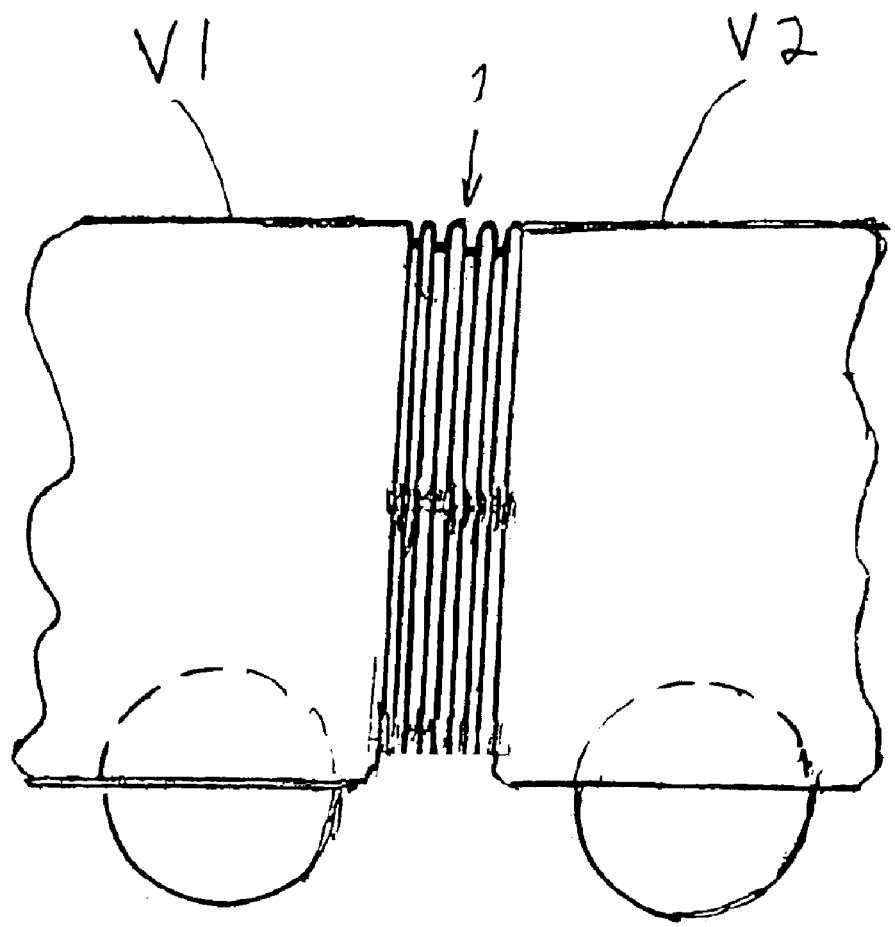
FIG. 3 is a partial side view of two hinge-linked vehicles and a bellows.

FIG. 2 is a cross sectional view of the pleat insert unit; it can more specifically be seen that this pleat insert unit looks like a banana. In the bottom region 19 of the pleat insert unit, the schematically illustrated bellows bottom 30 joins the various pleat inserts or pleats (FIG. 1). The bellows bottom 30 increasingly flattens toward the central axis of the bellows, meaning the pleats gradually decrease in height until they finally, in the extreme case, taper in a fabric in order to achieve maximum ground clearance.

The main pleat further shows what will be termed a border frame that bears the reference numeral 16. Said border frame 16 serves to stabilize the pleat. On their upper but also on their lower side the pleats 21, 22, 23 of the pleat insert unit can also be provided with corresponding border frames 25 which, for clarity, have been merely outlined.

It has been found that, with the main pleat 10 having a height H1 of 120 mm and with the pleat 10 having a height H2 in the bottom region and with the pleat inserts of the pleat insert unit consisting of three pleat inserts 21, 22, 23 having a height of 40 mm each, a maximum expansion of 165 mm can be achieved, said expansion corresponding exactly to the dimension provided by the main pleat 10. The maximum expansion of 165 mm could still be increased if the border frames 16, 25 were dispensed with.

We claim:

1. A pleat or corrugation of a bellows of a connection between two hinge-linked vehicles or vehicle bodies, the bellows comprising a side wall having a main pleat, a bellows bottom, said main pleat being spaced from said bellows bottom so as to form a corner transition zone between said main pleat and said bellows bottom, and a pleated insert unit disposed in said corner transition zone between said main pleat and said bellows bottom, said main pleat having a vertex, said pleated insert unit having a plurality of insert pleats and an end region with a narrowed height, said plurality of insert pleats converging toward said end region, said end region being connected to said vertex of said main pleat.

2. A pleat or corrugation of a bellows of a connection between two hinge-linked vehicles or vehicle bodies according to claim 1, wherein said main pleat has main pleat sides extending to said bellows bottom, at least some of said plurality of insert pleats having outer sides connected to said main pleat sides.

3. A pleat or corrugation of a bellows of a connection between two hinge-linked vehicles or vehicle bodies according to claim 1, wherein said pleated insert unit has a bottom region opposite to said end region, said pleated insert unit at said bottom region having a height less than the height of said main pleat at said vertex.

4. A pleat or corrugation of a bellows of a connection between two hinge-linked vehicles or vehicle bodies according to claim 1, wherein said main pleat has main pleat sides extending along said corner transition zone from said vertex to a main pleat bottom region juxtaposed to said bellows bottom, said plurality of insert pleats having a height substantially equal to the height of said main pleat bottom region.

5. A pleat or corrugation of a bellows of a connection between two hinge-linked vehicles or vehicle bodies according to claim 1, wherein said main pleat comprises two converging main pleat sides joined at said vertex, said end region of said pleated insert unit having a thickness approximately equal to the thickness of the main pleat sides at said vertex.

6. A pleat or corrugation of a bellows of a connection between two hinge-linked vehicles or vehicle bodies according to claim 1, wherein said bellows bottom include a plurality of pleats.

7. A pleat or corrugation of a bellows of a connection between two hinge-linked vehicles or vehicle bodies according to claim 6, wherein said plurality of pleats of said bellows bottom gradually decrease in height.

8. A pleat or corrugation of a bellows of a connection between two hinge-linked vehicles or vehicle bodies according to claim 1, wherein said pleated insert unit is integrally formed from a plastic material.

9. A pleat or corrugation of a bellows of a connection between two hinge-linked vehicles or vehicle bodies according to claim 8, wherein said pleated insert unit is integrally formed from injected molded polyurethane.

10. A pleat or corrugation of a bellows of a connection between two hinge-linked vehicles or vehicle bodies according to claim 1 further comprising a border frame provided on said main pleat.

11. A pleat or corrugation of a bellows of a connection between two hinge-linked vehicles or vehicle bodies according to claim 1 further comprising a border frame provided on said pleated insert unit.

12. A pleat or corrugation of a bellows of a connection between two hinge-linked vehicles or vehicle bodies, the bellows comprising a sidewall which includes a main pleat with a vertex and wherein the bellows further includes a bellows bottom, the main pleat and the bellows bottom being disposed relative to one another so as to form a corner transition zone between the main pleat and the bellows bottom, the pleated insert comprising:
  an integral pleated insert unit disposed in said corner transition zone, said integral pleated insert unit having a plurality of insert pleats,
  said plurality of insert pleats converging to an end region so as to enable said end region to be connected to the vertex of said main pleat.

13. A pleat or corrugation of a bellows of a connection between two hinge-linked vehicles or vehicle bodies according to claim 12, wherein said pleated insert unit has a bottom region opposite to said end region, said pleated insert unit at said bottom region having a height less than the height of said end region.

14. A pleat or corrugation of a bellows of a connection between two hinge-linked vehicles or vehicle bodies according to claim 12, wherein said pleated insert unit is integrally formed from a plastic material.

15. A pleat or corrugation of a bellows of a connection between two hinge-linked vehicles or vehicle bodies according to claim 14, wherein said pleated insert unit is integrally formed from injected molded polyurethane.

16. A pleat or corrugation of a bellows of a connection between two hinge-linked vehicles or vehicle bodies according to claim 12, wherein said pleated insert unit comprises at least three pleats.

* * * * *